2,700,035
PRODUCTION OF POLYVINYL ALCOHOL

John E. Bristol, Niagara Falls, N. Y., assignor to E. I. du Pont de Nemours and Company, Wilmington, Del., a corporation of Delaware No Drawing. Application August 26, 1950,
Serial No. 181,678

7 Claims. (Cl. 260—91.3)

This invention relates to the production of polyvinyl alcohol by the saponification of a polyvinyl ester of a carboxylic acid in an alcoholic solution.

Various methods have been proposed for the production of polyvinyl alcohol by reacting a polyvinyl ester such as polyvinyl acetate with an alcohol such as ethanol or methanol. A satisfactory process of this type employs a limited quantity of alcohol solvent, the latter being evaporated off together with the by-product ester as the reaction proceeds, so that the resulting polyvinyl alcohol is obtained as a substantially dry, solid material. This method has the disadvantage that it requires rather expensive equipment including a stirring device of the kneader type and considerable power to operate the same, in order to mix the reaction mixture while it passes from a rather viscous solution of polyvinyl ester through a gel stage and thence to a dry, granular or otherwise finely divided polyvinyl alcohol product.

In another proposed process, solid particles of polyvinyl acetate such as polyvinyl acetate beads are dispersed in a mixture of methanol and a hydrocarbon liquid and catalyst is added to the dispersion which is heated and stirred until the polyvinyl acetate particles are converted to polyvinyl alcohol particles of about the same size. After removal of the product, the liquid medium is distilled to separate by-product methyl acetate and recover the hydrocarbon for reuse. The disadvantage of this process is that it depends upon the absorption of methanol plus catalyst into the interior of each particle. As the polyvinyl alcohol formed by the reaction is insoluble both in methanol and in the hydrocarbon liquid, methanol penetration into each particle becomes increasingly difficult as the reaction proceeds. If the methanol does not completely react with the interior of each particle, the resulting products will contain considerable quantities of unreacted polyvinyl acetate or partially alcoholized polyvinyl acetate.

An object of the present invention is to provide an improved process for the reaction of a polyvinyl ester with an alcohol to produce polyvinyl alcohol. A further object is to produce polyvinyl alcohol directly in diverse forms such as films, filaments or granulated particles of controlled shape and size. Another object is to produce small particles, films and other shapes of polyvinyl alcohol of uniform composition. Still other objects of the invention will be apparent from the following description.

The above objects may be attained in accordance with the present invention by forming a solution of the polyvinyl ester in the reactant alcohol together with a suitable alcoholysis catalyst, for example, an alkali metal alcoholate, casting, spreading, extruding or dispersing the solution in a suitable gaseous or liquid medium, or otherwise forming the solution, in shapes of small or relatively thin cross section and thereafter maintaining the formed solution at a temperature suitable to cause reaction to occur and removing therefrom by-product ester and any excess alcohol, to produce solid forms of polyvinyl alcohol of substantially the same shape.

In one method of practicing the invention, a polyvinyl acetate solution is prepared containing 2 to 4 moles of methanol per mol of vinyl acetate and a quantity of sodium methylate equal to about 0.1 to 3% of the weight of the polyvinyl acetate to serve as alcoholysis catalyst. Before the reaction has proceeded to any appreciable extent, the solution is spread out on a flat surface exposed to the air, to form a film which may vary in thickness from 0.1 to 10 millimeters. The liquid film is maintained at a suitable temperature, for example, 20 to 40° C. and the by-product methyl acetate together with excess alcohol is permitted to evaporate from the film. By controlling the rate of evaporation, together with proper initial adjustment of catalyst content of the solution, the reaction may proceed to any desired extent before or by the time evaporation is complete, resulting in a solid film of polyvinyl alcohol somewhat thinner than the original film of polyvinyl acetate solution.

In another method, I may extrude the polyvinyl acetate solution through orifices of various shapes to produce filaments, strips, rods, tubes or like thin bodied shapes having various cross-sectional shapes and having a thickness not to exceed about 10 millimeters. For example, the solution may be extruded through a circular orifice which may vary in size from as small as 0.1 millimeter to as large as 10 millimeters. Such filaments, rods or the like may be extruded into the air or into a liquid such as a hydrocarbon, which is a non-solvent for both polyvinyl acetate and polyvinyl alcohol, but preferably a solvent for methanol and methyl acetate. After the reaction has proceeded to the desired extent, the resulting extruded shape of polyvinyl alcohol, particularly filaments of small diameter, may be wound up on reels, or may be cut in lengths, as desired. For example, rods or ribbons may be cut up in short lengths to form small pieces which are convenient for storage and handling.

In still another modification of the invention, the polyvinyl acetate solution may be dispersed in a suitable non-solvent liquid, for example, a liquid hydrocarbon, to form globular or lenticular particles therein, the size of the particles generally being determined by the rate of stirring and the respective viscosities of the polyvinyl acetate solution and the hydrocarbon liquid. As the reaction proceeds these globular particles or droplets of polyvinyl acetate solution are converted to solid particles of polyvinyl alcohol of slightly smaller size, resulting in the production of a free flowing, dustless product of controlled particle size. If desired, particulate polyvinyl alcohol also may be produced by atomizing or spraying the polyvinyl acetate solution into air, for example, into a large chamber to which air is circulated as in conventional spray driers, whereby the current of air carries off the resultant vapors of methanol and methyl acetate and each droplet of polyvinyl acetate solution is converted to polyvinyl alcohol as the evaporation proceeds. In such cases, where the evaporation is fairly rapid, the catalyst concentration should be suitably increased and the temperature of the polyvinyl acetate solution suitably elevated to induce a rapid rate of reaction so that the reaction will be complete by the time the volatile materials have been completely evaporated from each droplet.

The invention is further illustrated by the following examples.

Example 1

A mixture of 100 grams of a 50% by weight solution of polyvinyl acetate in methanol and 10 grams of a 10% by weight solution of sodium methylate in methanol was cast on a glass plate at room temperature to form a film approximately 6 mm. thick. On standing exposed to the air at room temperature the wet film dried to a transparent film which was stripped from the glass plate. This was found to be a film of polyvinyl alcohol having a saponification No. of 280.

The polyvinyl alcohol film was insoluble in methanol or methyl acetate but soluble in cold water. On heating the aqueous solution to 60° C., the polyvinyl alcohol precipitated, the precipitate redissolving on cooling to room temperature. The film melted at 100° C.

A portion of the above polyvinyl alcohol film was immersed for 20 minutes in a 0.3% by weight methanol solution of sodium hydroxide, then immersed for 5 minutes in methyl acetate containing a small amount (less than 0.2% by weight) of glacial acetic acid. This treatment increased the toughness of the film and the treated film had a saponification No. of 70.

Another portion of the film was immersed for 30 minutes in a hot, 1% by weight methanol solution of sodium methylate, then removed and washed with a 1% by weight methanol solution of acetic acid and finally dried at 100°

C. The dried film was noticeably brittle and had a saponification No. of 7.

*Example 2*

A mixture of 100 grams of a 30% by weight methanol solution of polyvinyl acetate and 5 grams of a 10% by weight methanol solution of sodium methylate was cast on a glass plate and dried, as in Example 1. The resulting air-dried film was immersed in a dilute methyl acetate solution of acetic acid and dried at room temperature. The film had a saponification No. of 260 and was soluble in cold water and insoluble in hot water.

A portion of the film was immersed for 15 minutes in a 0.2% by weight methanol solution of sodium methylate, followed by neutralization in a dilute methyl acetate solution of acetic acid. The so treated film had a saponification No. of 90 and was soluble in both hot and cold water.

*Example 3*

A solution in methanol of 50% by weight of polyvinyl acetate and a quantity of sodium methylate equal to 0.3% of the weight of the polyvinyl acetate was permitted to flow, drop by drop, into a body of mineral oil at room temperature. Spherical globules (about 4 mm. diameter) of the solution formed in the oil and slowly settled to the bottom of the container. After 15 minutes the spherical droplets had set to tough rubbery, solid masses without substantial change in shape. These were removed, washed in a methyl acetate solution of acetic acid and dried. They were found to consist of polyvinyl alcohol; they were soluble in hot and cold water and had a saponification No. of 50.

*Example 4*

The method of Example 3 was repeated, except that the polyvinyl acetate solution was a mixture of 50 grams of a 40% methanol solution of polyvinyl acetate and 1 gram of a 10% methanol solution of sodium methylate; and a stream of solution was flowed into the oil with rapid agitation of the latter. This formed smaller globules, of about 40 mesh size. After continued agitation for 10 minutes, the particles were removed and washed as in Example 3. The product was a granular polyvinyl alcohol having a saponification No. of 240 and which was soluble in cold water. The product precipitated from its aqueous solution on heating and the precipitate redissolved on cooling.

The proportions of methanol and polyvinyl acetate in the polyvinyl acetate solution may be varied over a wide range, depending on factors such as the nature of the polyvinyl acetate (e. g. the viscosity of its methanol solutions), the desired shape and size of the resulting polyvinyl alcohol product, the method of forming such shape, rate of subsequent evaporation and the like. For example a large excess of alcohol, forming dilute solutions of polyvinyl acetate, may be used when the solution is to be cast on a solid surface to form a film. Small proportions of alcohol may be used to produce viscous, plastic masses suitable for certain extrusion operations. Generally I prefer to employ the least amount of methanol requisite. I may, for example, use an amount of methanol in slight excess of that theoretically required to completely alcoholize the polyvinyl acetate, or a smaller amount if the desired product is a partially saponified polyvinyl ester. In such cases, I may retard evaporation until the reaction is complete and thereafter evaporate to remove by-product methyl acetate. Generally, I prefer to use about 2 to 4 moles of methanol to one mole of polyvinyl acetate. If desired, smaller or larger amounts may be used, within the range of 1.3 to 60 moles of methanol to one mole of polyvinyl acetate. The proportion of 1.3 mole may be used with low viscosity grades of polyvinyl acetate; with high viscosity grades of materials, such low quantities of alcohol make the solution too viscous to handle and lead to incomplete and non-uniform reaction in the mass. Proportions of methanol above about 60 moles per mole of polyvinyl acetate are too dilute for economic operation.

In place of methanol, I may utilize other alcohols, e. g., ethanol, ethylene glycol monomethyl ether, and ethylene glycol monoethyl ether, generally in the same proportions as methanol. These alcohols are less effective than methanol. When ethanol is used, it is advisable to add a few percent of water to increase its solvent action on the polyvinyl ester.

Any acidic or basic material which is soluble or partially soluble in the polyvinyl acetate solution may be employed as catalyst for the alcoholysis reaction. Preferably I employ an alkali metal alcoholate or an alcoholic solution of an alkali metal hydroxide. It is essential that the catalyst be thoroughly mixed with the polyvinyl acetate solution before the latter is cast, extruded or otherwise formed in the desired shape. The proportion of catalyst may be the same as heretofore used for alcoholysis of polyvinyl esters. I prefer to use sodium methylate in amount equal to 0.1 to 3% of the weight of the polyvinyl acetate. At lower concentrations, the reaction is unduly slow; higher concentrations may be used but generally are uneconomical.

While the invention has been described with reference to the reaction between polyvinyl acetate and methanol, it may be utilized as well to react other polyvinyl esters of carboxylic acids, for example, the polymerized vinyl esters of formic, propionic, glutaric, acrylic, stearic, benzoic, phthalic and other carboxylic acids, which are capable of reacting with alcohols to form polyvinyl alcohol. In other words, the invention is applicable to the production of polyvinyl alcohol in all cases where polyvinyl alcohol may be made by reacting a polyvinyl ester with an alcohol in which said ester is soluble.

The invention may be employed to produce partially or completely saponified products, and herein and in the appended claims I employ the term "polyvinyl alcohol" to include any saponification product of a polyvinyl ester, whether partially or wholly saponified. The desired degree of saponification may be obtained by controlling the rate of reaction (by temperature control and catalyst concentration as known in the art), controlling the rate of removal of excess methanol and by the initial amounts of methanol and catalyst employed.

Shaped articles of partially alcoholized polyvinyl alcohol made by my process may be further alcoholized by contact with an alcoholysis catalyst. For example a film of partially alcoholized polyvinyl acetate may be immersed in a methanol solution of sodium methylate for 1 to 10 minutes, resulting in further alcoholysis.

The thickness of the film or other thin bodied shape cast, extruded, or otherwise formed may vary over a wide range, not exceeding 10 mm. in thickness. Thus, if the shape is a tube, the wall thickness of the tube should not exceed 10 mm., and if a filament or sphere, the diameter thereof will not exceed 10 mm. If the shape is a film or ribbon, the width thereof may be as large as desired but the thickness should not exceed 10 mm. More complicated shapes may be formed, e. g., by extrusion through appropriately shaped dies, but in any case the wall thickness of the various parts of such shapes should not exceed 10 mm. A thickness greater than 10 mm. is impractical as it does not permit complete removal of excess alcohol and by-product acetate. Also, if the thickness is too great, there is a tendency to form blisters or voids in the product formed by bubbles of vapors of the evaporating alcohol and acetate, when removed by evaporation. The removal of excess methanol and by-product methyl ester may be accomplished by evaporation or by solution in a liquid, such as a hydrocarbon oil, which is a non-solvent for polyvinyl acetate and polyvinyl alcohol but is a solvent for methanol and methyl acetate. Thus when a film or filament is cast or extruded into the air, the methanol and methyl acetate are removed by evaporation. The rate of evaporation may be controlled by movement of air across the surface and by controlling the air temperature and the concentrations of methanol and methyl acetate vapor in the air. Likewise when the material is extruded or dispersed in a hydrocarbon liquid, the rate of transfer of methanol and methyl acetate form the vinyl resin into the hydrocarbon may be controlled by movement of the liquid and by controlling the methanol and methyl acetate contents of the hydrocarbon liquid.

The reaction temperature may vary from around 5° C. up to the boiling point, e. g., up to about 60° C. Below 5° C. the reaction is exceedingly slow. Generally, I prefer a reaction temperature of 20 to 40° C.

The hydrocarbon liquid employed in practicing my invention may be any which does not contain an excessive proportion of impurities, e. g., water, which will react with the alcoholysis catalyst or otherwise disturb the reaction. Preferably, I employ ordinary lubricating oils, which may be light or heavy.

An advantage of the present invention is that it permits the direct production of polyvinyl alcohol in a diversity of physical forms or shapes of controlled dimensions. Thus, for example, the polyvinyl alcohol may be produced in the form of films, ribbons, strips, rods, filaments, granules and various other shapes capable of being formed by various methods for forming plastic masses such as extrusion and the like. While such forms are restricted to relatively small cross-sectional dimensions, the thickness thereof may be varied over a fairly wide range from 0.1 to 10 millimeters. Due to the fact that the catalyst is incorporated in the polyvinyl alcohol solution before casting, extruding or otherwise forming the desired shape, the product is uniform and homogeneous in composition throughout the cross section of each particle or shape. A further advantage of the invention is that it minimizes the amount of excess alcohol, as a relatively small excess may be employed. A further advantage is that expensive equipment and large expenditure of power is not required.

I claim:

1. The process for the production of polyvinyl alcohol which comprises adding to a methanol solution of polyvinyl acetate having a ratio between 1.3 to 60 moles of methanol to 1 mole of acetate, a quantity of an alkali metal alcoholate equal to about 0.1 to 3% of the weight of said polyvinyl acetate, forming said solution into a thin-bodied shape having a thickness between about 0.1 millimeter and 10 millimeters, retaining substantially said shape during the course of the resulting reaction and removing methanol and methyl acetate therefrom at such rate that the desired degree of alcoholysis of the polyvinyl acetate is substantially complete when said methanol and methyl acetate have been substantially completely removed.

2. The process according to claim 1 in which said polyvinyl acetate solution is formed into a film having a thickness of 0.1 to 10 millimeters.

3. The process according to claim 1 in which said polyvinyl acetate solution is formed into a filament having a thickness of 0.1 to 10 millimeters.

4. The process according to claim 1 in which said polyvinyl acetate solution is formed into discrete particles, the diameters of which are 0.1 to 10 millimeters.

5. The process according to claim 1 in which the formed shape of polyvinyl acetate solution is formed by flowing said solution into a hydrocarbon liquid in which polyvinyl acetate is substantially insoluble and the excess methanol and the methyl acetate are removed by solution in said hydrocarbon liquid.

6. The process according to claim 1 in which the polyvinyl acetate solution is dispersed by stirring it into a liquid hydrocarbon to form globular particles not exceeding 10 millimeters in diameter.

7. The process for the production of polyvinyl alcohol which comprises forming an alcoholic solution of polyvinyl acetate in a ratio between 1.3 to 60 moles of alcohol to one mole of acetate, and containing an alcoholysis catalyst, forming said solution into a thin-bodied shape having a thickness between about 0.1 millimeter and 10 millimeters and removing alcohol and by-product ester therefrom, while retaining substantially the aforesaid shape during the course of the resulting reaction.

References Cited in the file of this patent

UNITED STATES PATENTS

| Number | Name | Date |
|---|---|---|
| 2,467,774 | Plambeck | Apr. 19, 1949 |
| 2,502,715 | Germain | Apr. 4, 1950 |
| 2,605,259 | Germain | July 29, 1952 |
| 2,642,419 | Waugh et al. | June 16, 1953 |
| 2,643,994 | Germain | June 30, 1953 |

FOREIGN PATENTS

| 903,576 | France | Oct. 9, 1945 |